United States Patent
Lau et al.

(10) Patent No.: US 10,029,315 B2
(45) Date of Patent: Jul. 24, 2018

(54) DRILL BIT

(71) Applicant: Milwaukee Electric Tool Corporation, Brookfield, WI (US)

(72) Inventors: Edward S. Lau, Menomonee Falls, WI (US); Douglas W. Allen, Pewaukee, WI (US); Marc S. D'Antuono, Wauwatosa, WI (US); Courtney McCool, Menomonee Falls, WI (US); Smith C. Theiler, Plymouth, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 390 days.

(21) Appl. No.: 14/390,094

(22) PCT Filed: May 1, 2013

(86) PCT No.: PCT/US2013/039110
§ 371 (c)(1),
(2) Date: Oct. 2, 2014

(87) PCT Pub. No.: WO2013/166182
PCT Pub. Date: Nov. 7, 2013

(65) Prior Publication Data
US 2015/0063935 A1 Mar. 5, 2015

(51) Int. Cl.
*B23B 51/00* (2006.01)
*B27G 15/00* (2006.01)
(52) U.S. Cl.
CPC .......... *B23B 51/0009* (2013.01); *B23B 51/00* (2013.01); *B27G 15/00* (2013.01);
(Continued)

(58) Field of Classification Search
CPC ............... Y10T 408/899; Y10T 408/90; Y10T 408/901; Y10T 408/9065; B23B 51/0009;
(Continued)

(56) References Cited

U.S. PATENT DOCUMENTS

| | | | | |
|---|---|---|---|---|
| 1,557,900 A | * | 10/1925 | Thompson | B27G 15/00 408/213 |
| 2,613,710 A | * | 10/1952 | Emmons | B27G 15/00 408/213 |

(Continued)

FOREIGN PATENT DOCUMENTS

| | | |
|---|---|---|
| GB | 2449789 A | 12/2008 |
| WO | 9706338 | 2/1997 |
| WO | WO 2005049295 A1 * 6/2005 | ............. B23B 51/02 |

OTHER PUBLICATIONS

PCT/US2013/039110 International Search Report dated Aug. 15, 2013 (3 pages).

*Primary Examiner* — Alan Snyder
(74) *Attorney, Agent, or Firm* — Michael Best & Friedrich LLP

(57) ABSTRACT

A drill bit configured for use with a rotary power tool including a chuck. The drill bit includes a shank including a first end and a second end, and a paddle that extends from the second end of the shank. The paddle includes a first face including a concave portion, a second face opposite the first face and the second face including a convex portion opposite the concave portion, a cutting surface, a cutting edge located at an end of the cutting surface, a relief angle defined by the cutting surface, and an angled rake face adjacent the cutting surface that defines a rake angle that is between about 5 degrees and about 45 degrees.

19 Claims, 16 Drawing Sheets

(52) U.S. Cl.
CPC ....... *B23B 2251/04* (2013.01); *B23B 2251/14* (2013.01); *B23B 2251/60* (2013.01); *Y10T 408/901* (2015.01); *Y10T 408/909* (2015.01)

(58) Field of Classification Search
CPC .. B23B 2251/04; B23B 2251/14; B27G 15/00
See application file for complete search history.

(56) References Cited

U.S. PATENT DOCUMENTS

| | | | | |
|---|---|---|---|---|
| 2,627,292 A * | 2/1953 | Kronwall | ................ | B27G 15/00 408/213 |
| 4,330,229 A * | 5/1982 | Croydon | ................ | B23B 51/02 408/212 |
| 4,527,449 A * | 7/1985 | Sydlowski | ............ | B23B 31/005 408/16 |
| 4,529,341 A * | 7/1985 | Greene | ................... | B23B 51/02 408/211 |
| 5,193,951 A * | 3/1993 | Schimke | ................ | B27G 15/00 408/214 |
| 5,221,166 A * | 6/1993 | Bothum | ................. | B27G 15/00 408/212 |
| 5,286,143 A * | 2/1994 | Schimke | ................ | B27G 15/00 408/211 |
| 5,697,738 A * | 12/1997 | Stone | ......................... | B21J 5/12 408/225 |
| 6,227,774 B1 * | 5/2001 | Haughton | .............. | B27G 15/00 408/225 |
| 6,652,202 B2 * | 11/2003 | Remke | ................... | B27G 15/00 408/214 |
| 6,957,937 B2 * | 10/2005 | Vasudeva | ............ | B23B 51/0009 408/211 |
| 7,140,814 B2 | 11/2006 | Singh et al. | | |
| 7,267,513 B2 * | 9/2007 | Wiker | .................... | B27G 15/00 408/214 |
| 7,516,686 B2 * | 4/2009 | Wang | ...................... | B23B 51/02 408/230 |
| 7,520,703 B2 * | 4/2009 | Rompel | ................. | B23B 51/02 408/225 |
| 7,988,389 B2 * | 8/2011 | Miebach | ................ | B23B 51/02 408/211 |
| 8,979,444 B2 * | 3/2015 | Dost | ................... | B23B 51/0009 408/214 |
| 2003/0233923 A1 * | 12/2003 | Wang | ..................... | B27G 15/00 83/669 |
| 2004/0052594 A1 * | 3/2004 | Singh | ..................... | B27G 15/00 408/211 |
| 2006/0118341 A1 | 6/2006 | Huber | | |
| 2009/0116918 A1 * | 5/2009 | Dost | ..................... | B27G 15/00 408/213 |
| 2014/0356088 A1 * | 12/2014 | Santamarina | ........... | B23B 51/02 408/144 |

* cited by examiner

DRILL BIT

CROSS-REFERENCE TO RELATED APPLICATIONS

This application is a national stage filing under 35 U.S.C. 371 of International Application No. PCT/US2013/039110, filed May 1, 2013, which claims priority to U.S. Provisional Patent Application No. 61/641,073, filed May 1, 2012, the entire contents of which are both hereby incorporated by reference herein.

BACKGROUND

The present invention relates to drill bits.

Drill bits typically include a shank and a cutting end attached to the shank. The shank is typically received in a chuck of a rotatory power tool to attach the drill bit to the power tool for rotation with the chuck. Rotation of the chuck therefore rotates the shank and the cutting end and the cutting end can be used to drill an aperture into a work-piece, such as wood, masonry, and metal.

SUMMARY

In one embodiment, the invention provides a drill bit configured for use with a rotary power tool including a chuck. The drill bit includes a shank including a first end and a second end, the first end configured to be received in the chuck of the rotatory power tool. The drill bit further includes a paddle that extends from the second end of the shank, and the paddle includes a first face including a concave portion, a second face opposite the first face and the second face including a convex portion opposite the concave portion, a cutting surface, a cutting edge located at an end of the cutting surface, a relief angle defined by the cutting surface, and an angled rake face adjacent the cutting surface that defines a rake angle that is between about 5 degrees and about 45 degrees.

In another embodiment the invention provides a drill bit configured for use with a rotary power tool including a chuck. The drill bit includes a shank including a first end and a second end, the first end configured to be received in the chuck of the rotatory power tool. The drill bit further includes a paddle that extends from the second end of the shank. The paddle includes a first face, a second face opposite the first face, a cutting surface, a cutting edge located at an end of the cutting surface, a relief angle defined by the cutting surface, an angled rake face adjacent the cutting surface that defines a rake angle that is between about 5 degrees and about 45 degrees, a first side generally normal to the first face, and a second side generally normal to the first face and opposite the first side, and wherein the first side includes a recess between the second end of the shank and the cutting surface.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
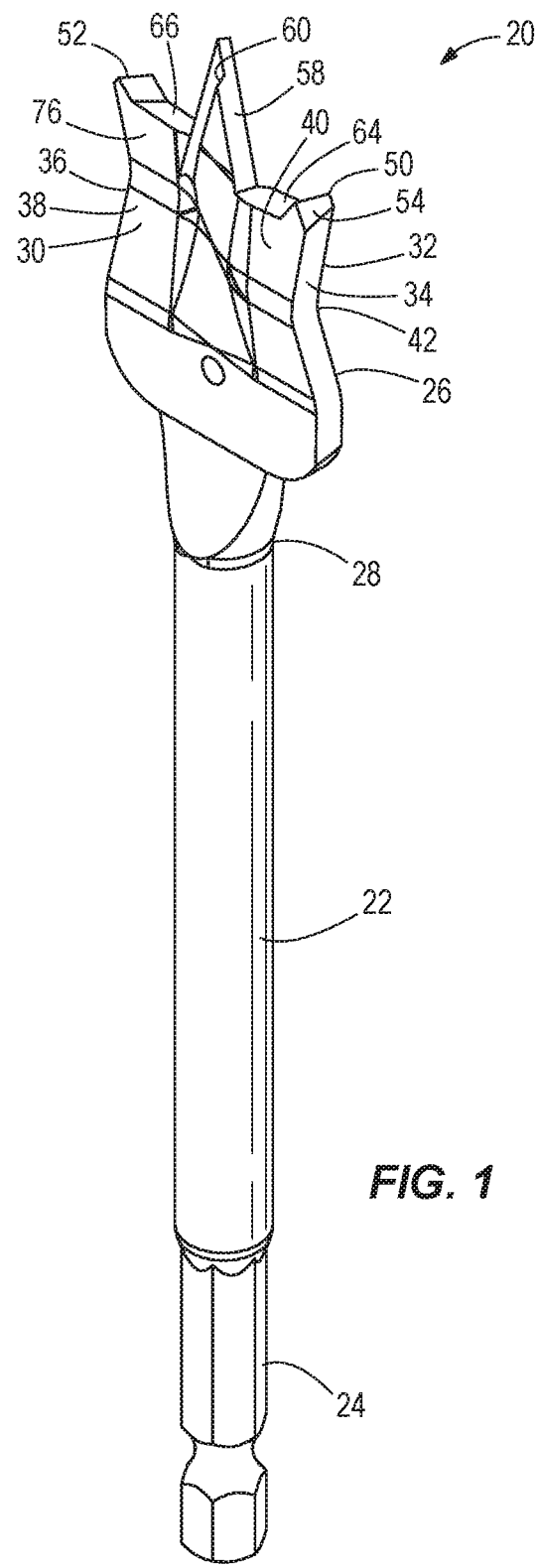
FIG. 1 is a perspective view of a drill bit according to one embodiment of the invention.
Figure 2:
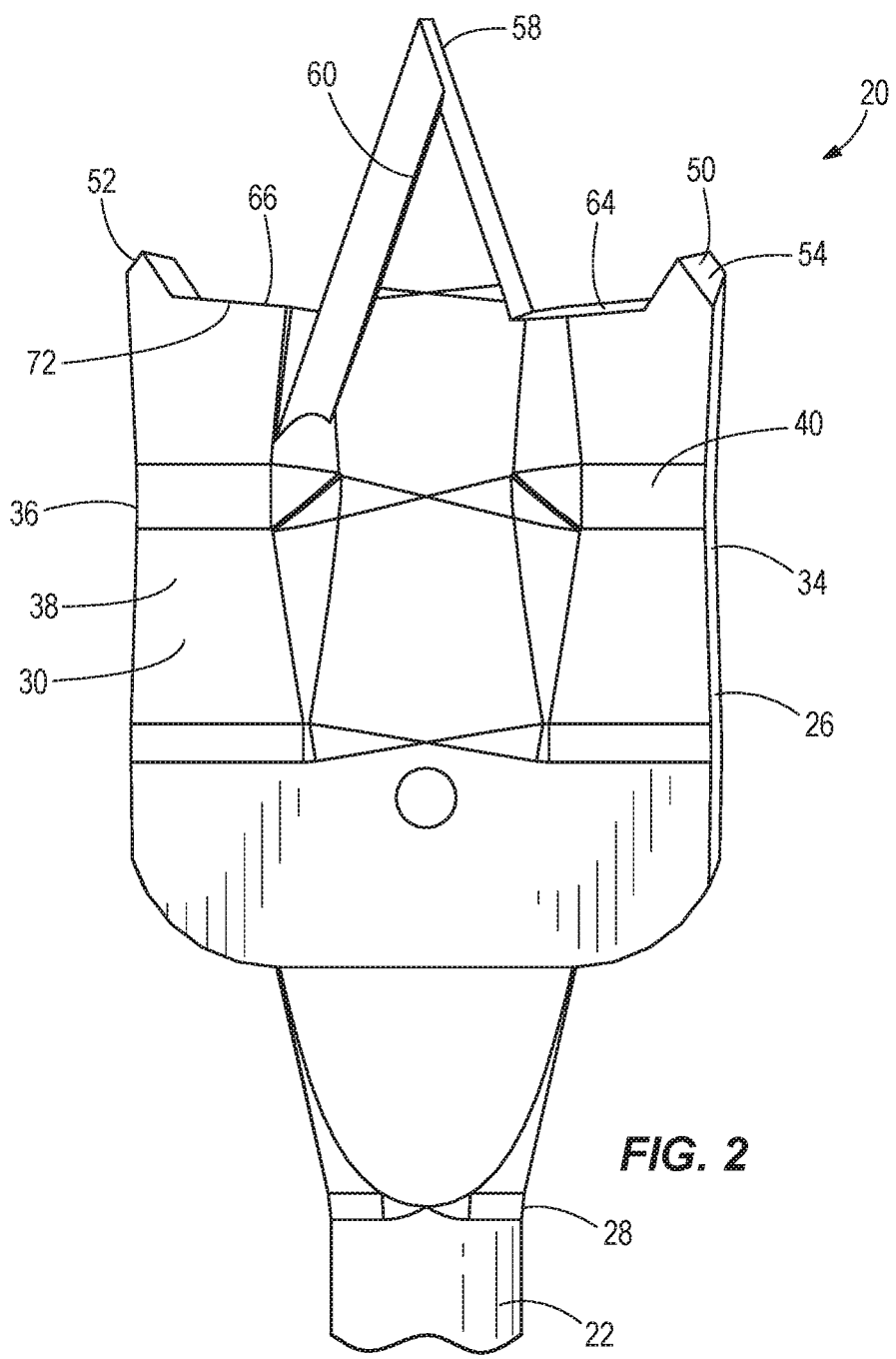
FIG. 2 is an enlarged first side view of the drill bit of FIG. 1.
Figure 3:
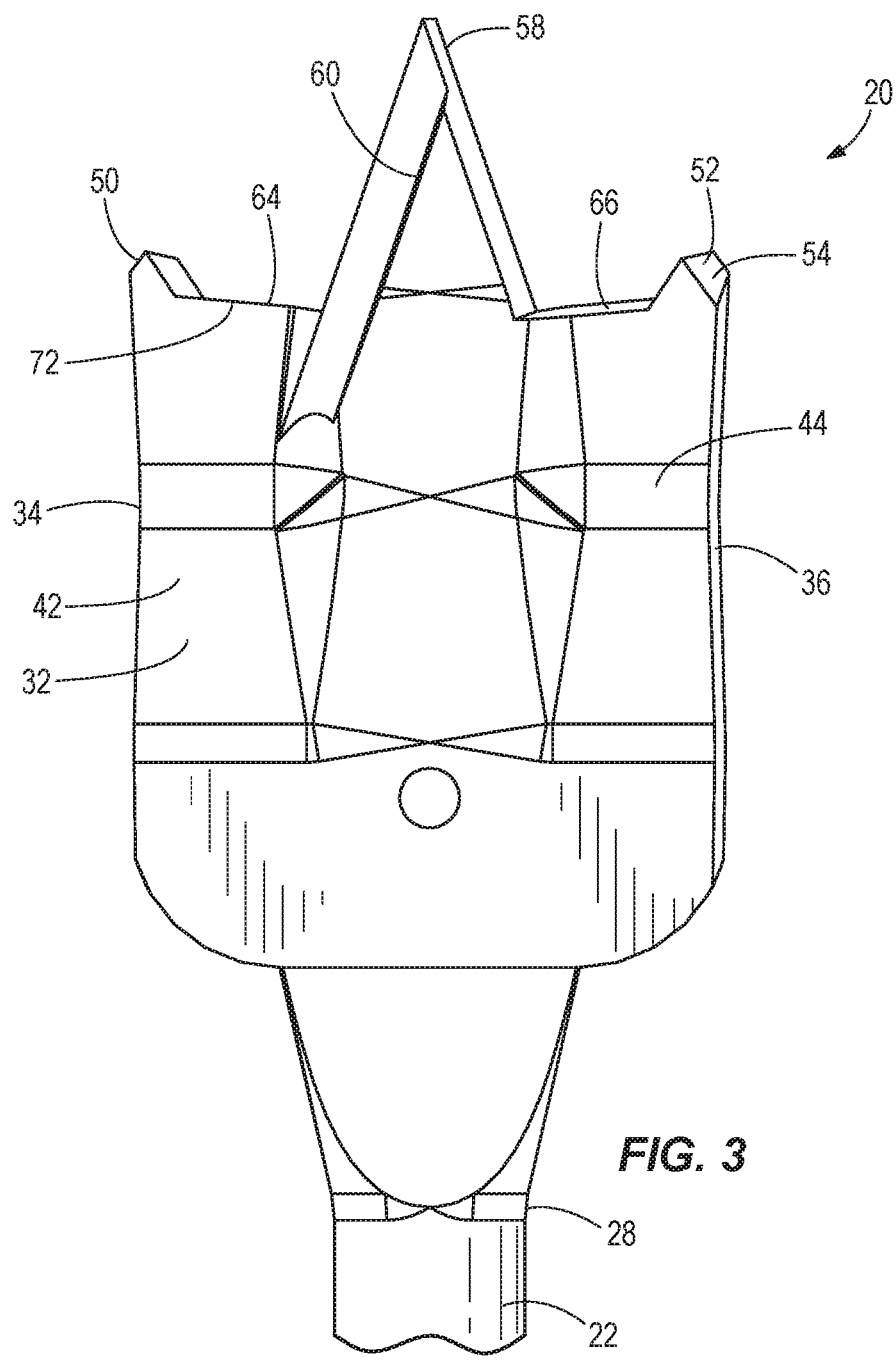
FIG. 3 is an enlarged second side view of the drill bit of FIG. 1.
Figure 4:
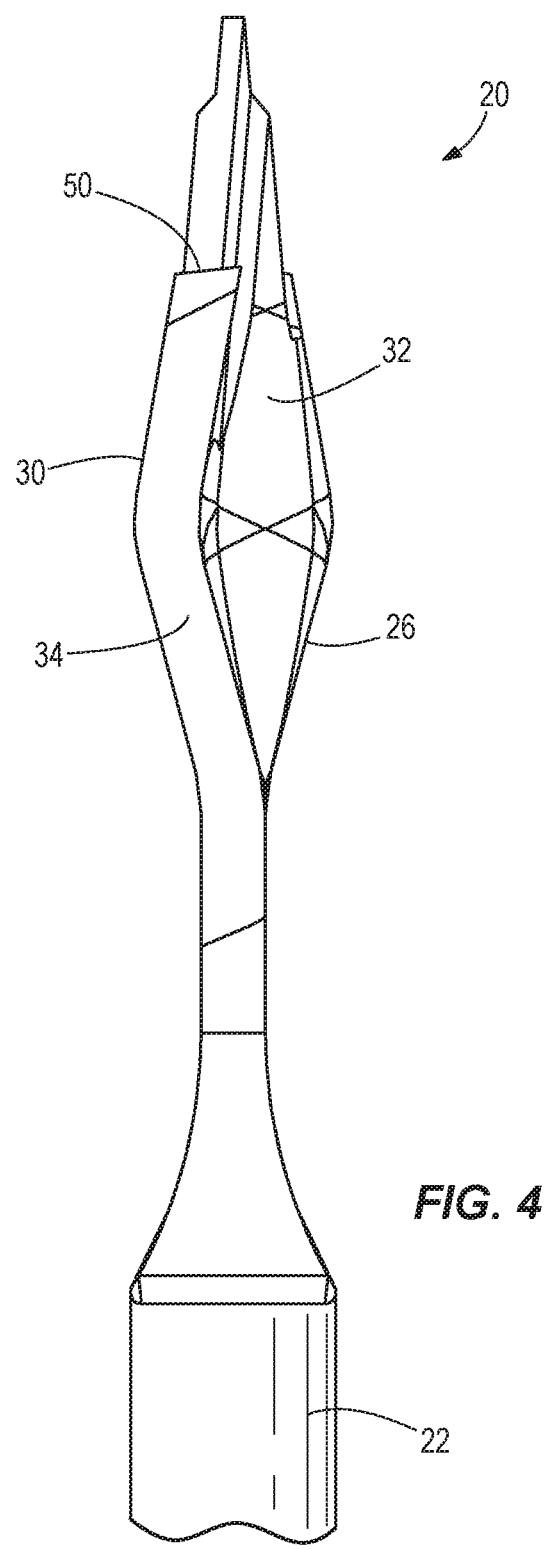
FIG. 4 is an enlarged third side view of the drill bit of FIG. 1.
Figure 5:
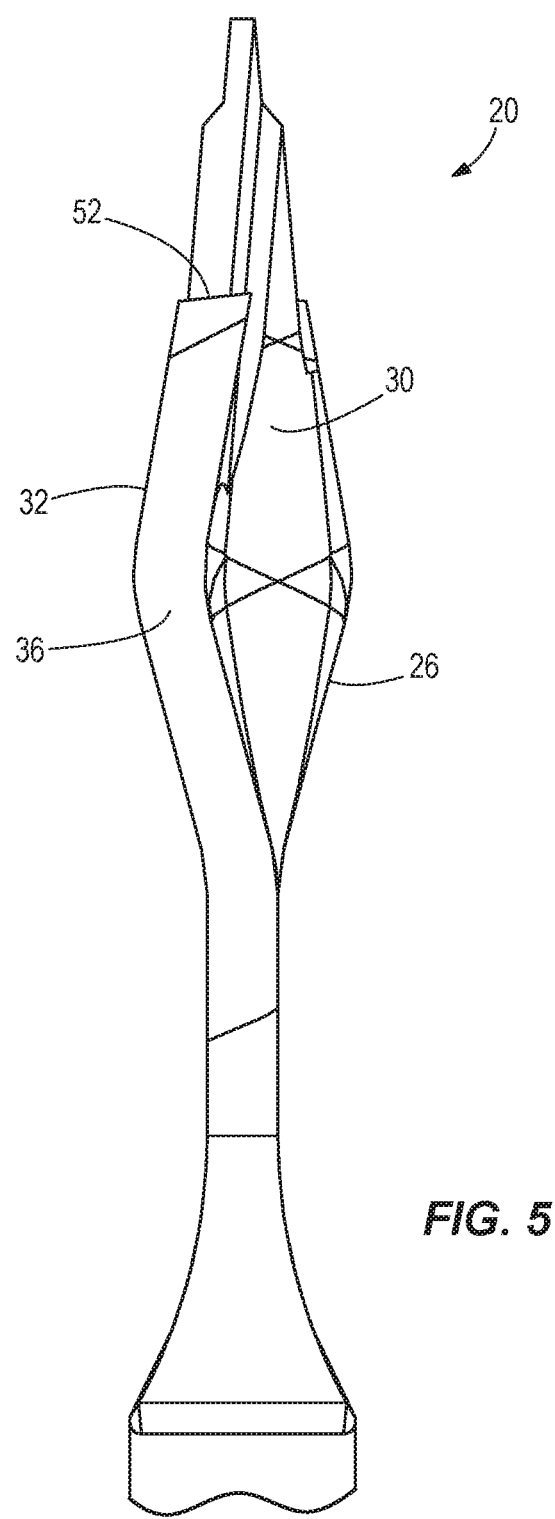
FIG. 5 is an enlarged fourth side view of the drill bit of FIG. 1.

FIG. 1 illustrates a drill bit 20. The illustrated drill bit 20 includes a shank 22. The shank 22 includes an end portion 24 that can be received in a chuck of a rotary power tool, such as a drill. The drill bit 20 further includes a paddle 26 that extends from an end 28 of the shank 22 opposite the end portion 24. The paddle 26 includes a first face 30, a second face 32, a first side 34, and a second side 36. In the illustrated embodiment, the paddle 26 is bent or kinked to form a concave portion 38 on the first face 30 and a convex portion 40 on the first face 30. Likewise, a concave portion 42 (FIG. 3) is located on the second face 32 and a convex portion 44 is located on the second face 32. Therefore, as best seen in FIGS. 4 and 5, the sides 34 and 36 of the paddle 26 are curved.

Referring to FIG. 1, a first spur 50 extends from the paddle 26 adjacent the first side 34 and a second spur 52 extends from the paddle 26 adjacent the second side 36. Each of the spurs 50 and 52 includes an inset surface 54 that allows the spurs 50, 52 and sides 34, 36 to clean out material being removed from a work piece when a hole is being drilled by the bit 20. A tip 58 that includes cutting edges 60 extends from the paddle 26 centrally between the spurs 50 and 52.

Figure 6:
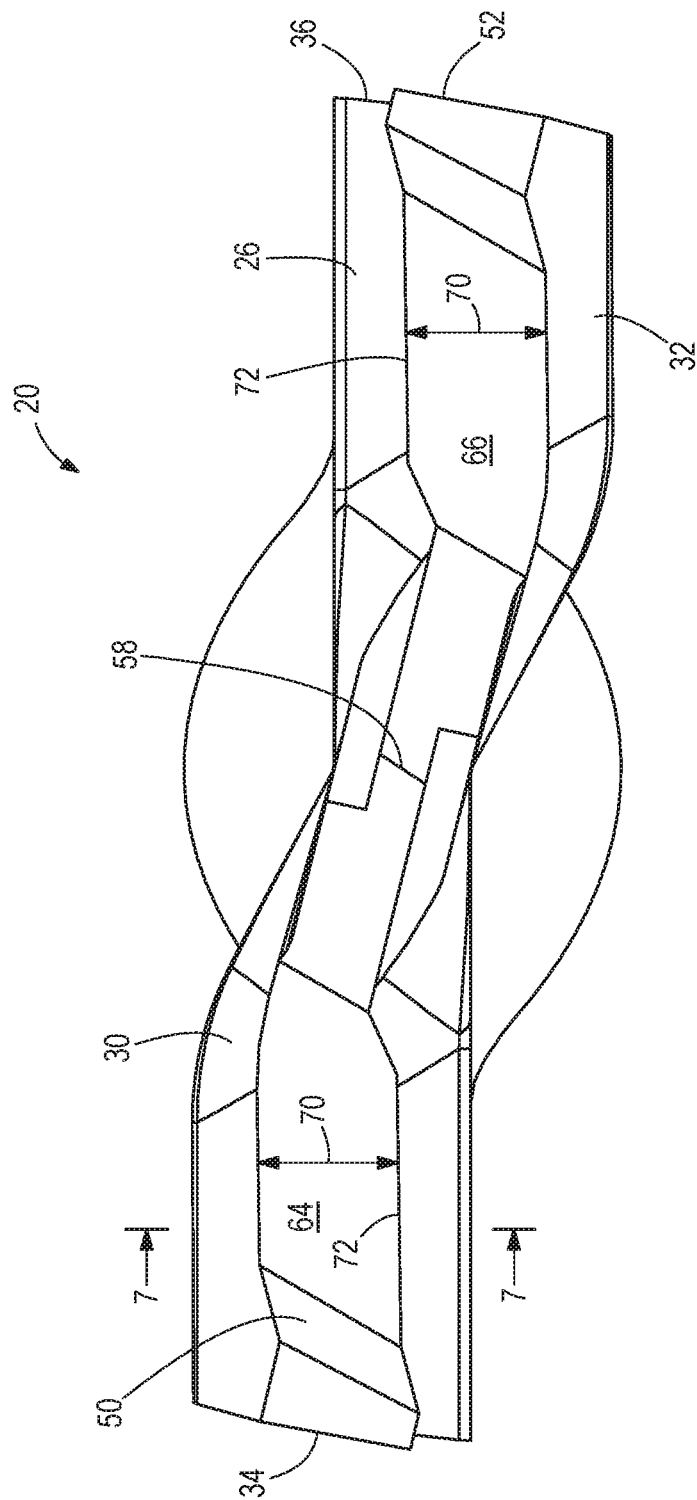
FIG. 6 is a top end view of the drill bit of FIG. 1.
Figure 7:
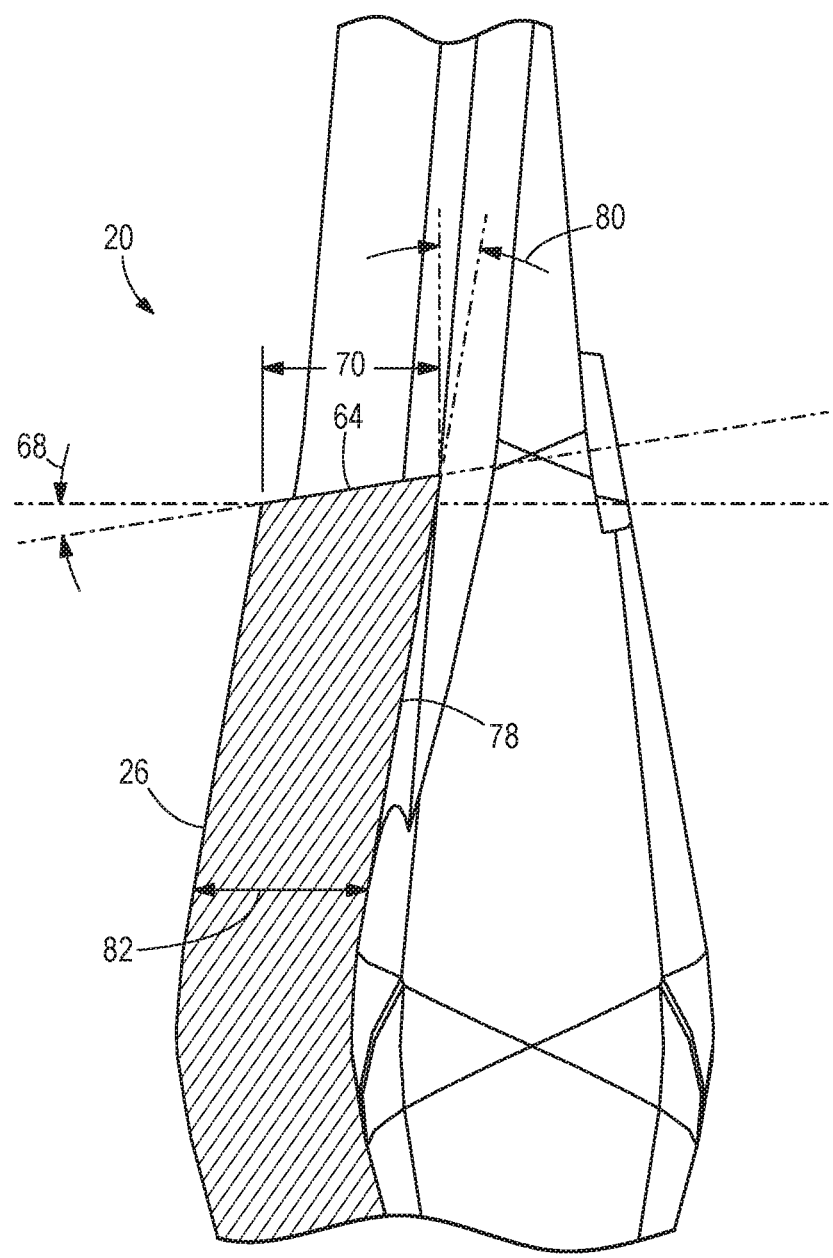
FIG. 7 is a cross-sectional view of the drill bit taken along lines 7-7 of FIG. 6.

Referring to FIGS. 2, 3, 6, and 7, a first cutting surface 64 is located on the paddle 26 and extends from the first spur 50 to the tip 58 and a second cutting surface 66 is located on the paddle 26 and extends from the second spur 52 to the tip 58. The cutting surfaces 64 and 66 each define a relief angle 68, which in the illustrated embodiment is approximately 10 degrees. In other embodiments the relief angle 68 can range from about 5 degrees to about 35 degrees. Referring to FIGS. 6 and 7, each of the cutting surfaces 64 and 66 has a thickness 70 and defines a cutting edge 72. Also, the paddle 26 includes a first angled rake face 76 adjacent the first cutting surface 66 and a second angled rake face 78 adjacent the second cutting surface 64. A rake angle 80, which is illustrated in FIG. 7, is defined by the rake faces 76 and 78.

In the illustrated embodiment, the rake angle 80 is about 10 degrees. In other embodiments, the rake angle 80 can range from about 5 degrees to about 45 degrees. The rake angle 80 increases the thickness 70 of the cutting surfaces 64 and 66 relative to a thickness 82 (FIG. 7) of the paddle 26 adjacent the shank 22. In the illustrated embodiment, the curved sides 34 and 36 of the paddle 26 provide relatively thick cutting surfaces 64 and 66 (i.e., thicknesses 70) and a relatively large relief angle 68 and rake angle 80, which provides faster and more efficient cutting without sacrificing strength of the cutting edge 72 and provides cutting edges 72 that are relatively robust against damage from nails, staples, and the like that may be in the work-pieces being cut, which is typically wood.

Figure 8:
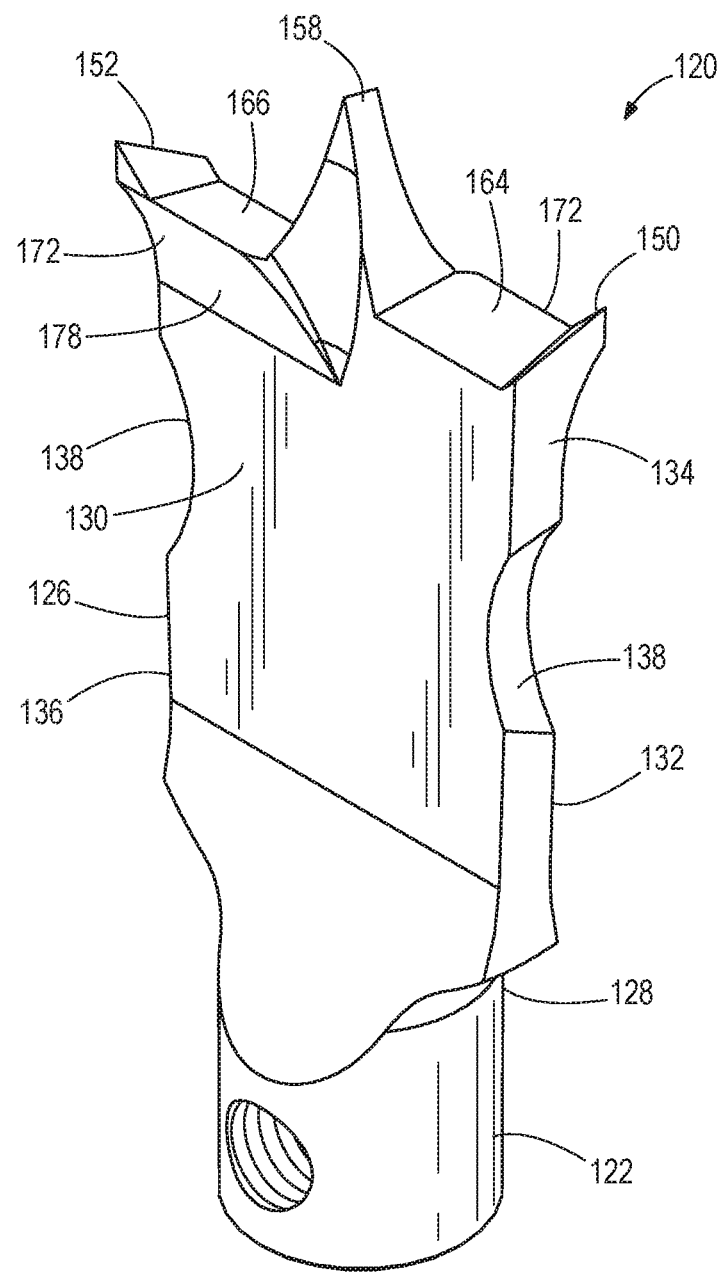
FIG. 8 is a perspective view of a drill bit according to another embodiment of the invention.
Figure 9:
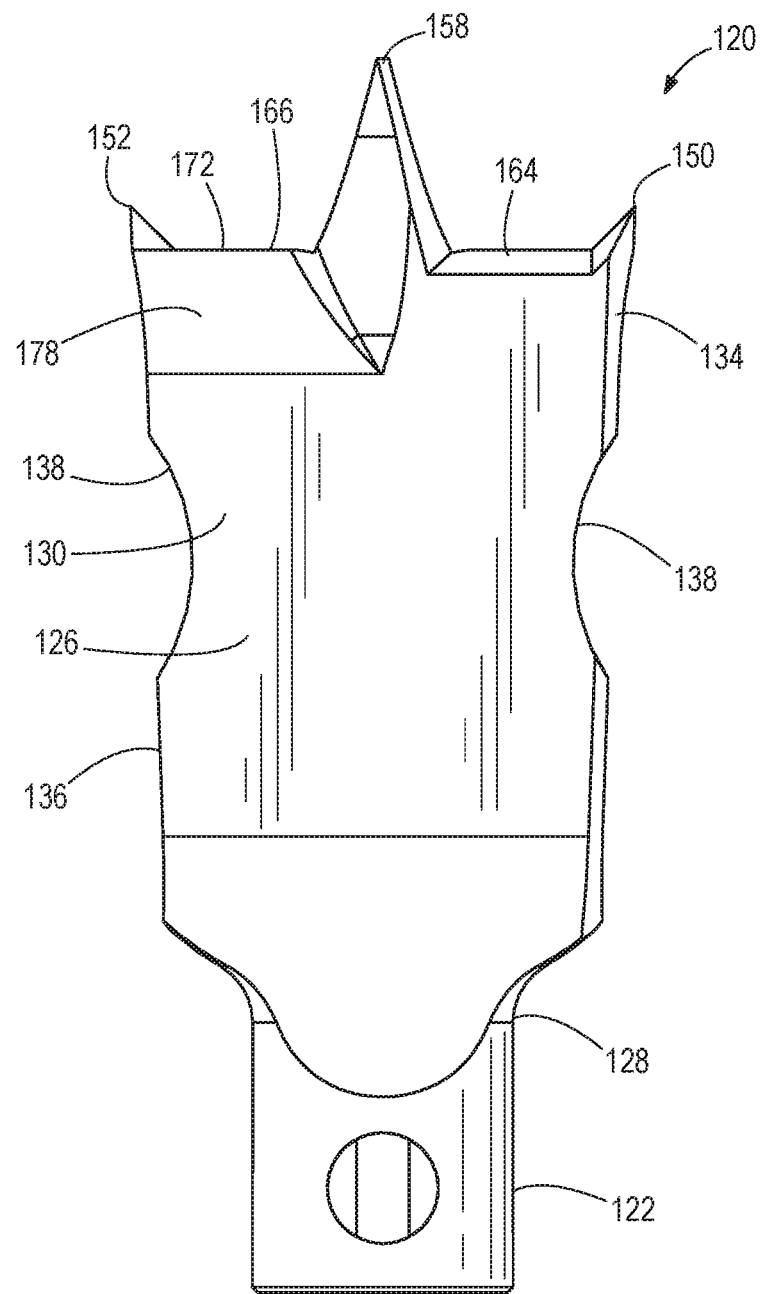
FIG. 9 is a first side view of the drill bit of FIG. 8.
Figure 10:
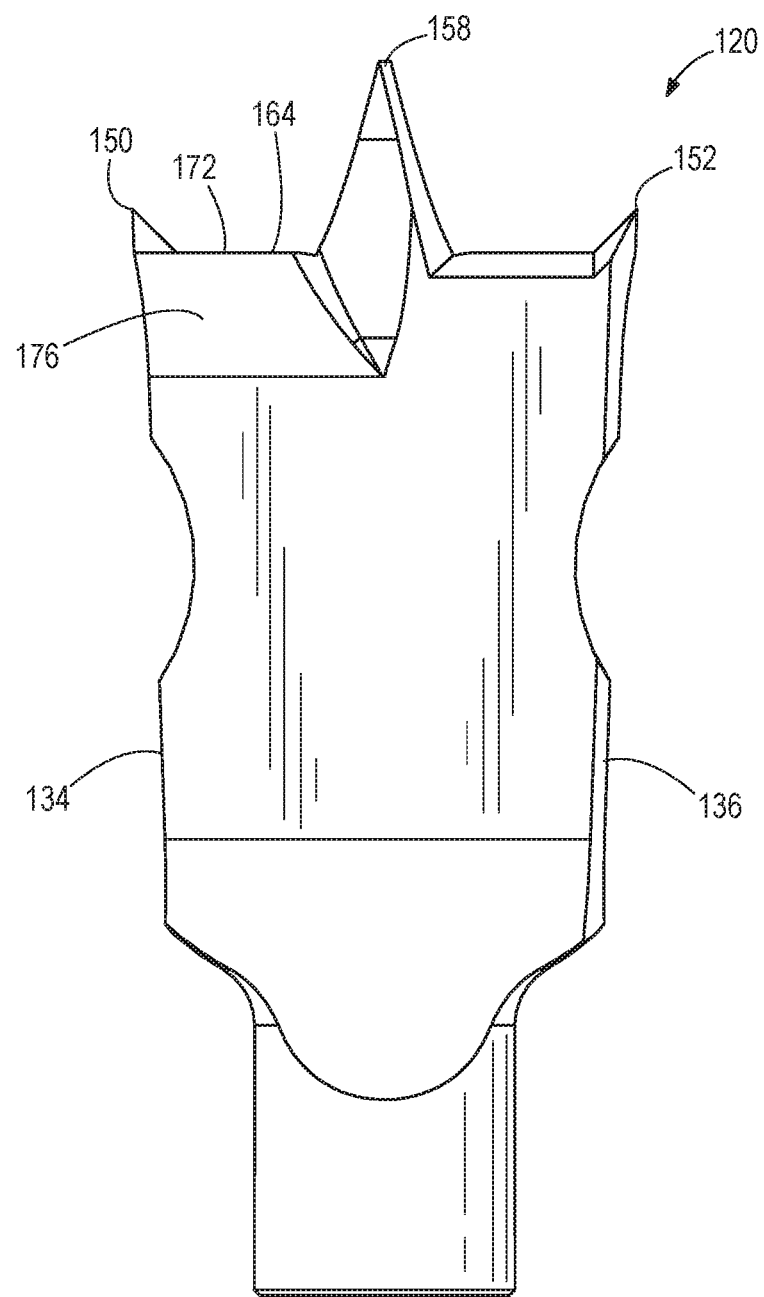
FIG. 10 is a second side view of the drill bit of FIG. 8.
Figure 11:
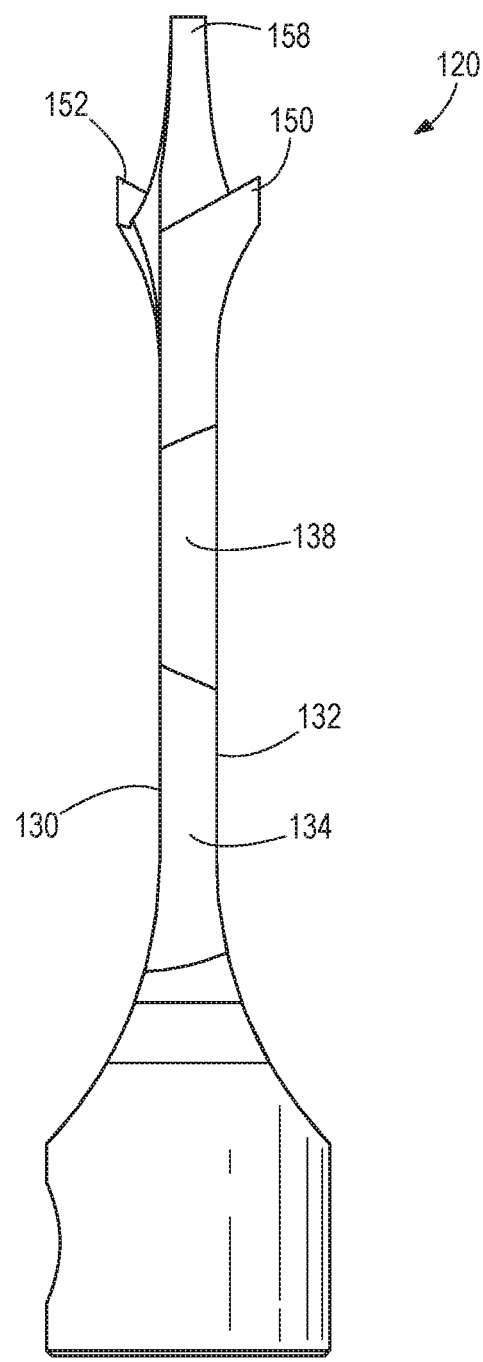
FIG. 11 is a third side view of the drill bit of FIG. 8.
Figure 12:
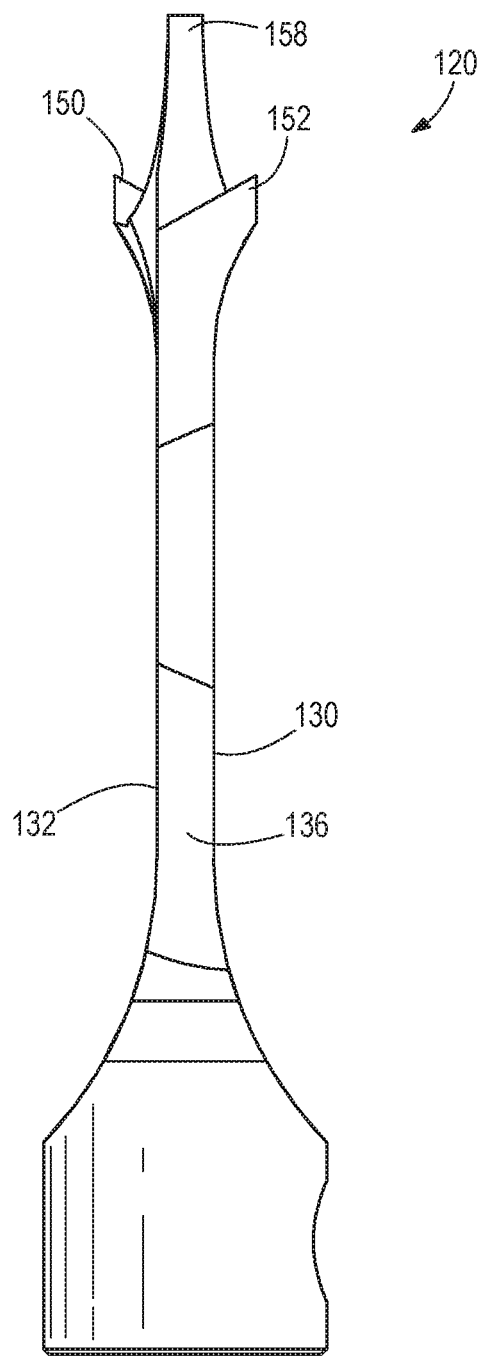
FIG. 12 is a fourth side view of the drill bit of FIG. 8.

FIG. 8 illustrates a drill bit 120 according to another embodiment. The illustrated drill bit 120 includes a shank 122, and only a portion of the shank 122 is illustrated. The shank 122 includes an end portion (not illustrated) that can be received in a chuck of a rotary power tool, such as a drill. The drill bit 120 further includes a paddle 126 that extends from an end 128 of the shank 122 opposite the end portion received in the chuck. The paddle 126 includes a first face 130, a second face 132, a first side 134, and a second side 136. In the illustrated embodiment, a relief or semi-circular recess 138 is formed in both the first side 134 and the second side 136. The recesses 138 reduce drag on the drill bit 120 when it is used to cut a work-piece which provides quicker and more efficient cutting.

A first spur 150 extends from the paddle 126 adjacent the first side 134 and a second spur 152 extends from the paddle 126 adjacent the second side 136. A tip 158 that includes cutting edges 160 extends from the paddle 126 centrally between the spurs 150 and 152.

Figure 13:
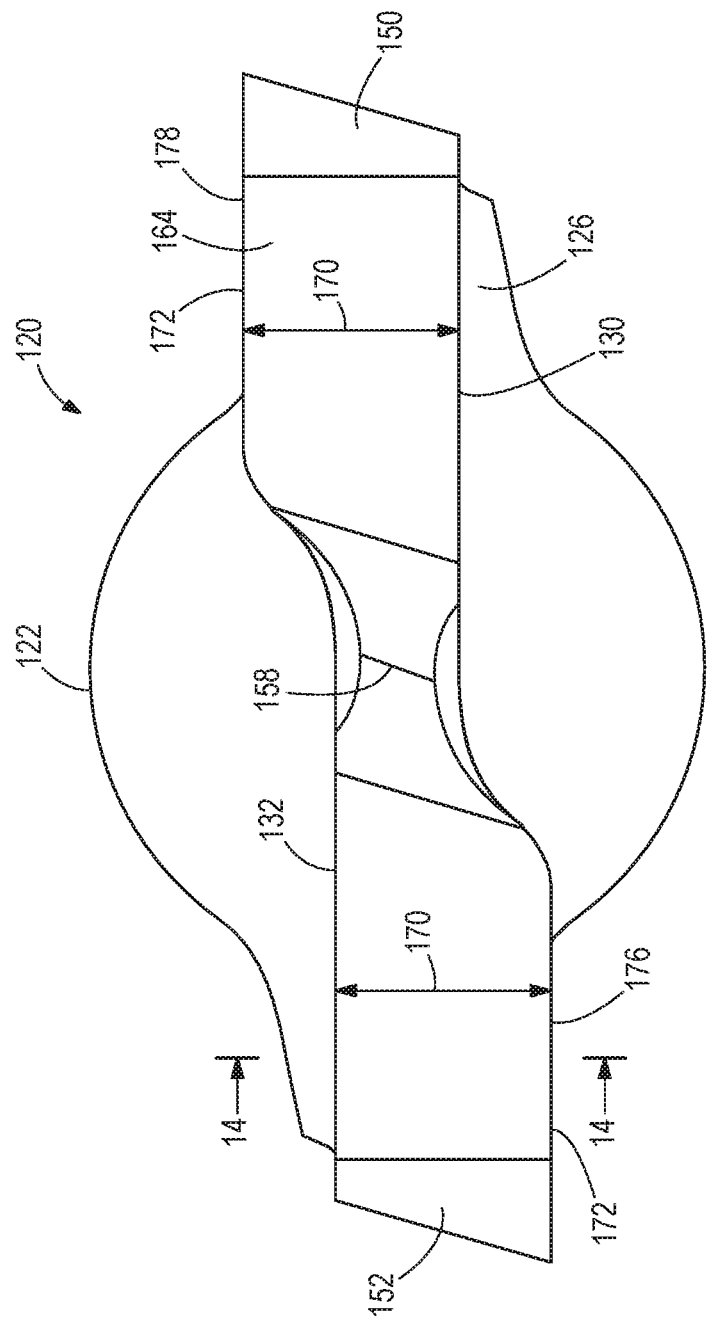
FIG. 13 is a top end view of the drill bit of FIG. 8.
Figure 14:
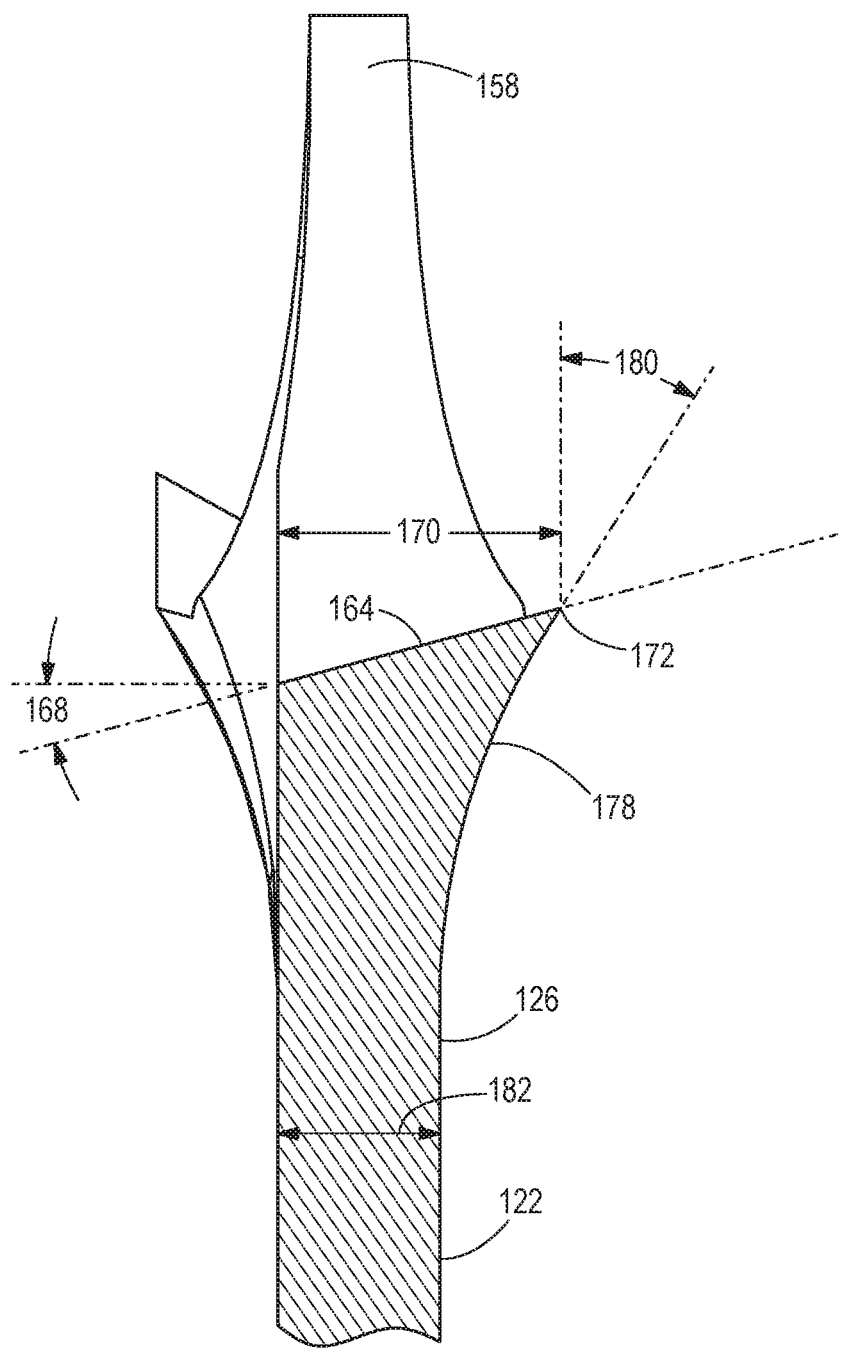
FIG. 14 is a cross-sectional view taken along lines 14-14 of FIG. 6.

Referring to FIGS. 8, 13, and 14, a first cutting surface 164 is located on the paddle 126 and extends from the first spur 150 to the tip 158 and a second cutting surface 166 is located on the paddle 126 and extends from the second spur 152 to the tip 158. The cutting surfaces 164 and 166 each define a relief angle 168, which in the illustrated embodiment is approximately 15 degrees. In other embodiments the relief angle 168 can range from about 5 degrees to about 35 degrees. Referring to FIGS. 13 and 14, each of the cutting surfaces 164 and 166 has a thickness 170 and defines a cutting edge 172. Also, the paddle 126 includes a first angled rake face 176 adjacent the first cutting surface 166 and a second angled rake face 178 adjacent the second cutting surface 164. A rake angle 180, which is illustrated in FIG. 14, is defined by the rake faces 166 and 178. In the illustrated embodiment, the rake angle 180 is about 30 degrees. In other embodiments, the rake angle 180 can range from about 5 degrees to about 45 degrees. The rake angle 180 increases the thickness 170 of the cutting surfaces 164 and 166 relative to a thickness 182 (FIG. 14) of the paddle 126 adjacent the shank 122. The increased thickness 170 behind the rake faces 176 and 178 and the cutting edges 172 allows for a greater rake face angle and faster and more efficient cutting without sacrificing strength of the cutting edge 172 and provides cutting edges 172 that are relatively robust against damage from nails, staples, and the like that may be in the work-pieces being cut, which is typically wood.

Figure 15:
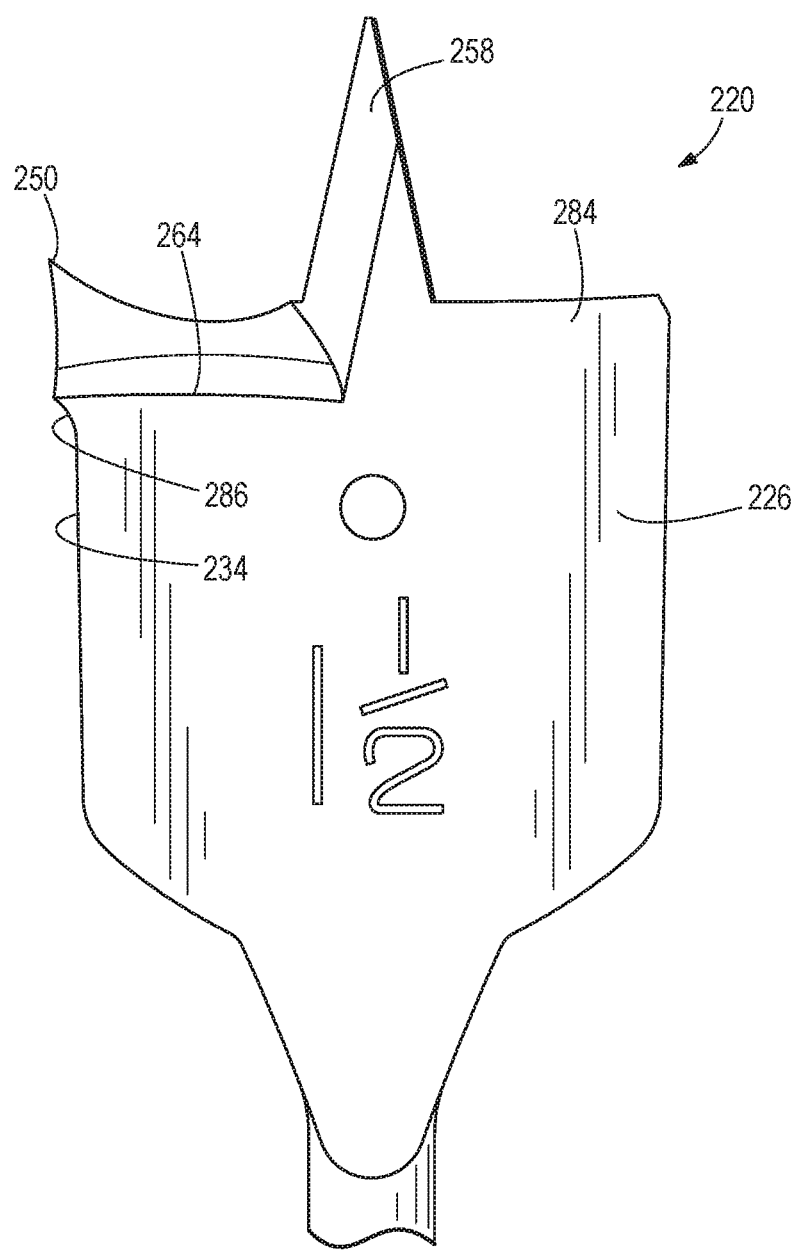
FIG. 15 is a side view of a drill bit according to another embodiment of the invention.

FIG. 15 illustrates a drill bit 220 according to another embodiment. The drill bit 220 is similar to the drill bit 120 discussed above. However, the drill bit 220 includes a paddle 226 having only a single cutting edge 264 and a single spur 250. A side 284 of the paddle 226 opposite the cutting edge 264 (i.e., on the other side of tip 258) that does not include a cutting edge removes material from a hole being drilled by the bit 220 and cut by the edge 264. Also, a first side 234 of the paddle 226 adjacent the cutting edge 264 includes a relief 286 that reduces the width of the paddle 226 to reduce drag on the paddle 226 when the bit 220 is used to cut a work-piece.

Figure 16:
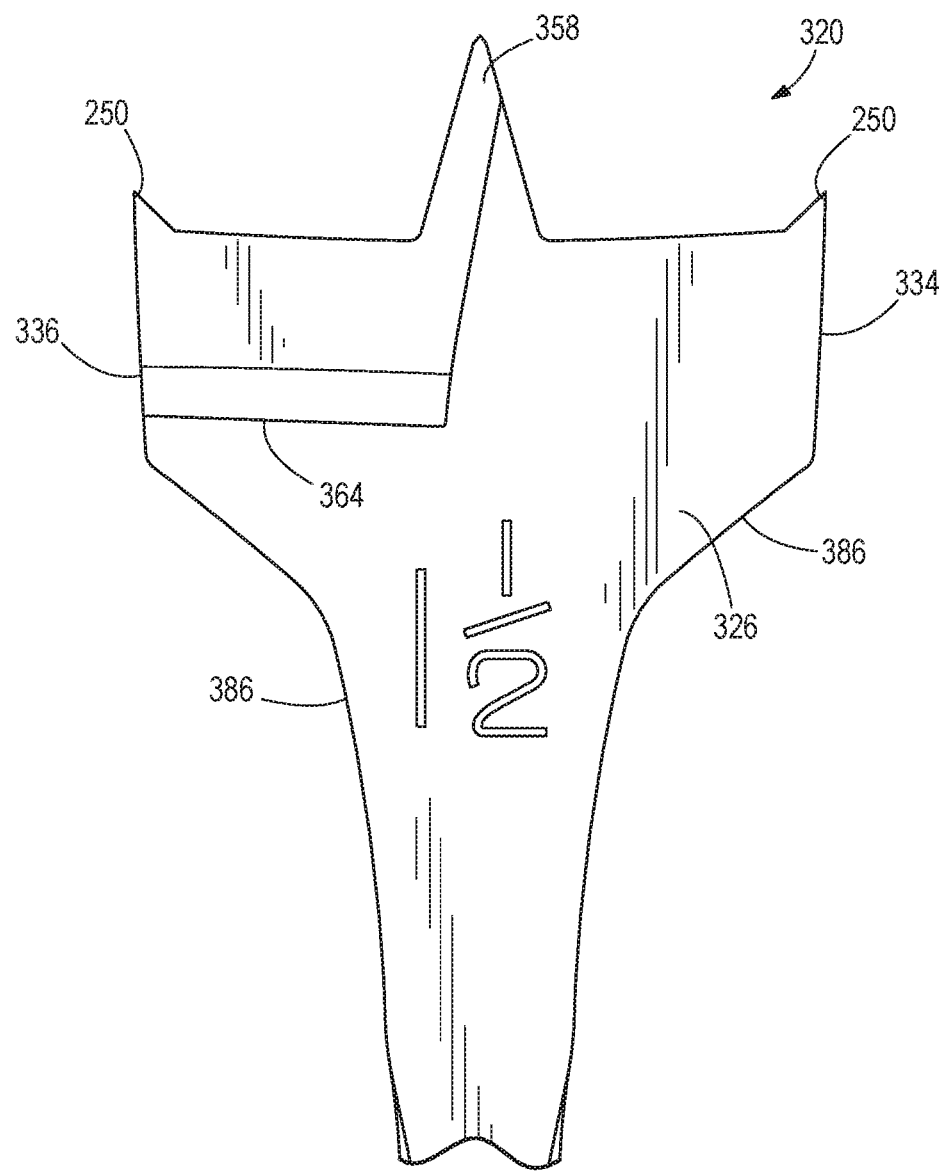
FIG. 16 is a side view of a drill bit according to yet another embodiment of the invention.

FIG. 16 illustrates a drill bit 320 according to another embodiment. The drill bit 320 is similar to the drill bit 220 discussed above. The drill bit 320 includes a paddle 326 having a cutting edge 364 and a spur 250 on each side of a tip 358 of the paddle 326. Also, a relatively large relief 386 is located on each side 334 and 336 of the paddle 326 to reduce drag on the paddle 326 when the bit 320 is used to cut a work-piece.

Various features and advantages of the invention are set forth in the following claims.

What is claimed is:

1. A drill bit configured for use with a rotary power tool including a chuck, the drill bit comprising:
   a shank including a first end and a second end, the first end configured to be received in the chuck of the rotatory power tool; and
   a paddle that extends from the second end of the shank, the paddle including,
      a first face including a concave portion,
      a second face opposite the first face and the second face including a convex portion opposite the concave portion,
      a cutting surface,
      a cutting edge located at an end of the cutting surface,
      a relief angle defined by the cutting surface, and
      an angled rake face adjacent the cutting surface that defines a rake angle that is between 5 degrees and 45 degrees,
      a spur adjacent the cutting surface,
      an inset surface disposed on the spur,
      a first side generally normal to the first face,
      a second side generally normal to the first face and opposite the first side, and wherein the first side includes a semi-circular recess between the second end of the shank and the cutting surface to reduce drag during a cutting operation.

2. The drill bit of claim 1, wherein the rake angle is 10 degrees.

3. The drill bit of claim 1, wherein a thickness of the paddle is defined as a distance measured from the first face to the second face generally normal to the first and second faces, and wherein the thickness of the paddle increases along a portion of the paddle in a direction from the second end of the shank toward the cutting surface.

4. The drill bit of claim 1, wherein the relief angle is between 5 degrees and 30 degrees.

5. The drill bit of claim 1, wherein the relief angle is 10 degrees.

6. The drill bit of claim 1, wherein the cutting surface is a first cutting surface and the cutting edge is a first cutting edge, and wherein the paddle further includes a second cutting surface and a second cutting edge.

7. The drill bit of claim 6, wherein the relief angle is a first relief angle, the paddle further including a second relief angle defined by the second cutting surface, and wherein the second relief angle is between 5 degrees to 30 degrees.

8. The drill bit of claim 6, wherein the angled rake face is a first angled rake face and the rake angle is a first rake angle, the paddle further including a second angled rake face adjacent the second cutting surface that defines a second rake angle that is between 5 degrees and 45 degrees.

9. The drill bit of claim 6, wherein the paddle further includes a tip between the first cutting surface and the second cutting surface.

10. The drill bit of claim 1, wherein the concave portion is a first concave portion and the convex portion is a first convex portion, the first face including a second convex portion and the second face including a second concave portion opposite the second convex portion.

11. A drill bit configured for use with a rotary power tool including a chuck, the drill bit comprising:
  a shank including a first end and a second end, the first end configured to be received in the chuck of the rotary power tool;
  a rotational axis coaxially aligned with the shank and extending between the first end of the shank and the second end of the shank; and
  a paddle that extends from the second end of the shank, the paddle including,
    a first face,
    a second face opposite the first face,
    a cutting surface,
    a cutting edge located at an end of the cutting surface,
    a relief angle defined by the cutting surface,
    an angled rake face adjacent the cutting surface that defines a rake angle that is between 5 degrees and 45 degrees,
    a spur adjacent the cutting surface,
    a first side generally normal to the first face, and
    a second side generally normal to the first face and opposite the first side, and wherein the first side includes a semi-circular recess between the second end of the shank and the cutting surface to reduce drag during a cutting operation,
    an inset surface disposed on the spur, the inset surface is adjacent the first side and is angled inwardly toward the rotational axis such that a tip of the spur is radially inset relative to the first side.

12. The drill bit of claim 11, wherein the rake angle is 30 degrees.

13. The drill bit of claim 11, wherein a thickness of the paddle is defined as a distance measured from the first face to the second face generally normal to the first and second faces, and wherein the thickness of the paddle increases along a portion of the paddle in a direction from the second end of the shank toward the cutting surface.

14. The drill bit of claim 11, wherein the relief angle is between 5 degrees and 30 degrees.

15. The drill bit of claim 11, wherein the relief angle is 15 degrees.

16. The drill bit of claim 11, wherein the cutting surface is a first cutting surface and the cutting edge is a first cutting edge, and wherein the paddle further includes a second cutting surface and a second cutting edge.

17. The drill bit of claim 16, wherein the relief angle is a first relief angle, the paddle further including a second relief angle defined by the second cutting surface, and wherein the second relief angle is between 5 degrees and 30 degrees.

18. The drill bit of claim 16, wherein the angled rake face is a first angled rake face and the rake angle is a first rake angle, the paddle further including a second angled rake face adjacent the second cutting surface that defines a second rake angle that is between 5 degrees and 45 degrees.

19. The drill bit of claim 16, wherein the paddle further includes a tip between the first cutting surface and the second cutting surface.

* * * * *